United States Patent
Tsujimoto et al.

(10) Patent No.: US 8,141,352 B2
(45) Date of Patent: Mar. 27, 2012

(54) EXHAUST PURIFICATION DEVICE OF AN INTERNAL COMBUSTION ENGINE

(75) Inventors: Kenichi Tsujimoto, Susono (JP); Shinya Hirota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 306 days.

(21) Appl. No.: 12/312,516

(22) PCT Filed: Apr. 16, 2008

(86) PCT No.: PCT/JP2008/057787
§ 371 (c)(1),
(2), (4) Date: May 14, 2009

(87) PCT Pub. No.: WO2008/130046
PCT Pub. Date: Oct. 30, 2008

(65) Prior Publication Data
US 2009/0266057 A1    Oct. 29, 2009

(30) Foreign Application Priority Data
Apr. 18, 2007 (JP) ................................. 2007-109436

(51) Int. Cl.
*F01N 3/10* (2006.01)
(52) U.S. Cl. .......................................... 60/301; 60/295
(58) Field of Classification Search ................... 60/286, 60/295, 301, 303
See application file for complete search history.

(56) References Cited

U.S. PATENT DOCUMENTS

| 7,313,911 | B2 | 1/2008 | Pfeifer et al. |
| 2002/0029564 | A1 | 3/2002 | Roth et al. |
| 2004/0050037 | A1 | 3/2004 | Betta et al. |
| 2004/0076565 | A1* | 4/2004 | Gandhi et al. ................ 423/235 |
| 2006/0286012 | A1* | 12/2006 | Socha et al. .................. 422/177 |

FOREIGN PATENT DOCUMENTS

| JP | A 6-31137 | 2/1994 |
| JP | A 2000-257417 | 9/2000 |
| JP | A 2003-201888 | 7/2003 |
| JP | A 2003-524107 | 8/2003 |
| JP | A 2004-108176 | 4/2004 |
| JP | A 2006-506581 | 2/2006 |
| JP | A 2006-507926 | 3/2006 |
| JP | A 2006-519331 | 8/2006 |

* cited by examiner

*Primary Examiner* — Thomas Denion
*Assistant Examiner* — Jonathan Matthias
(74) *Attorney, Agent, or Firm* — Oliff & Berridge, PLC

(57) ABSTRACT

In an internal combustion engine, an NOX selective reducing catalyst is arranged in the engine exhaust passage, and an NOX storage catalyst able to store NOX contained in the exhaust gas is arranged at the upstream of the NOX selective reducing catalyst. The NOX storage catalyst is fed with mist fuel, and the NOX stored in the NOX storage catalyst and the fed fuel are used to produce an intermediate product comprising bonded molecules comprised of NH2 and a hydrocarbon molecule more than an equivalent ratio with respect to one NOX molecule. These intermediate products are adsorbed at the NOX selective reducing catalyst, whereby the adsorbed intermediate product reduces the NOX in the exhaust gas.

7 Claims, 2 Drawing Sheets

(A)

(B)

EXHAUST PURIFICATION DEVICE OF AN INTERNAL COMBUSTION ENGINE

TECHNICAL FIELD

The present invention relates to an exhaust purification device of an internal combustion engine.

BACKGROUND ART

Known in the art is an internal combustion engine arranging in the engine exhaust passage an $NO_X$ storage catalyst which stores $NO_X$ contained in the exhaust gas when the air fuel ratio of the inflowing exhaust gas is lean and releases the stored $NO_X$ when the air fuel ratio of the inflowing exhaust gas becomes a stoichiometric air fuel ratio or rich and arranging in the engine exhaust passage upstream of this $NO_X$ storage catalyst a compact three-way catalyst (see for example Japanese Patent Publication (A) No. 2004-108176). In this internal combustion engine, if the $NO_X$ storage ability of the $NO_X$ storage catalyst approaches saturation, the air fuel ratio of the exhaust gas is temporarily made rich whereby $NO_X$ is released from the $NO_X$ storage catalyst and reduced.

However, there is a problem in that, in this internal combustion engine, when making the $NO_X$ storage catalyst release $NO_X$ by feeding mist fuel upstream of the $NO_X$ storage catalyst, the $NO_X$ released from the $NO_X$ storage catalyst cannot be properly reduced.

DISCLOSURE OF THE INVENTION

An object of the present invention is to provide an exhaust purification device of an internal combustion engine able to reduce the $NO_X$ released from an $NO_X$ storage catalyst well.

According to the present invention, there is provided an exhaust purification device of an internal combustion engine arranging an $NO_X$ selective reducing catalyst in an engine exhaust passage, arranging an $NO_X$ storage catalyst able to store $NO_X$ contained in the exhaust gas in the engine exhaust passage upstream of the $NO_X$ selective reducing catalyst, arranging a fuel feed valve in the engine exhaust passage upstream of the $NO_X$ storage catalyst to feed a mist fuel from the fuel feed valve to the $NO_X$ storage catalyst, reacting $NO_X$ stored in the $NO_X$ storage catalyst and fed fuel on the $NO_X$ storage catalyst to produce an intermediate product comprising bonded molecules of NH and a hydrocarbon molecule more than an equivalent ratio with respect to one $NO_X$ molecule and making the intermediate product produced in the $NO_X$ storage catalyst be adsorbed at the $NO_X$ selective reducing catalyst so as to reduce $NO_X$ in the exhaust gas by the adsorbed intermediate product.

That is, in the present invention, by feeding mist fuel from the fuel feed valve to make the $NO_X$ storage catalyst release $NO_X$ and reducing the released $NO_X$ to, $NH_2$, the $NO_X$ is purified.

BEST MODE FOR CARRYING OUT THE INVENTION

Figure 1:
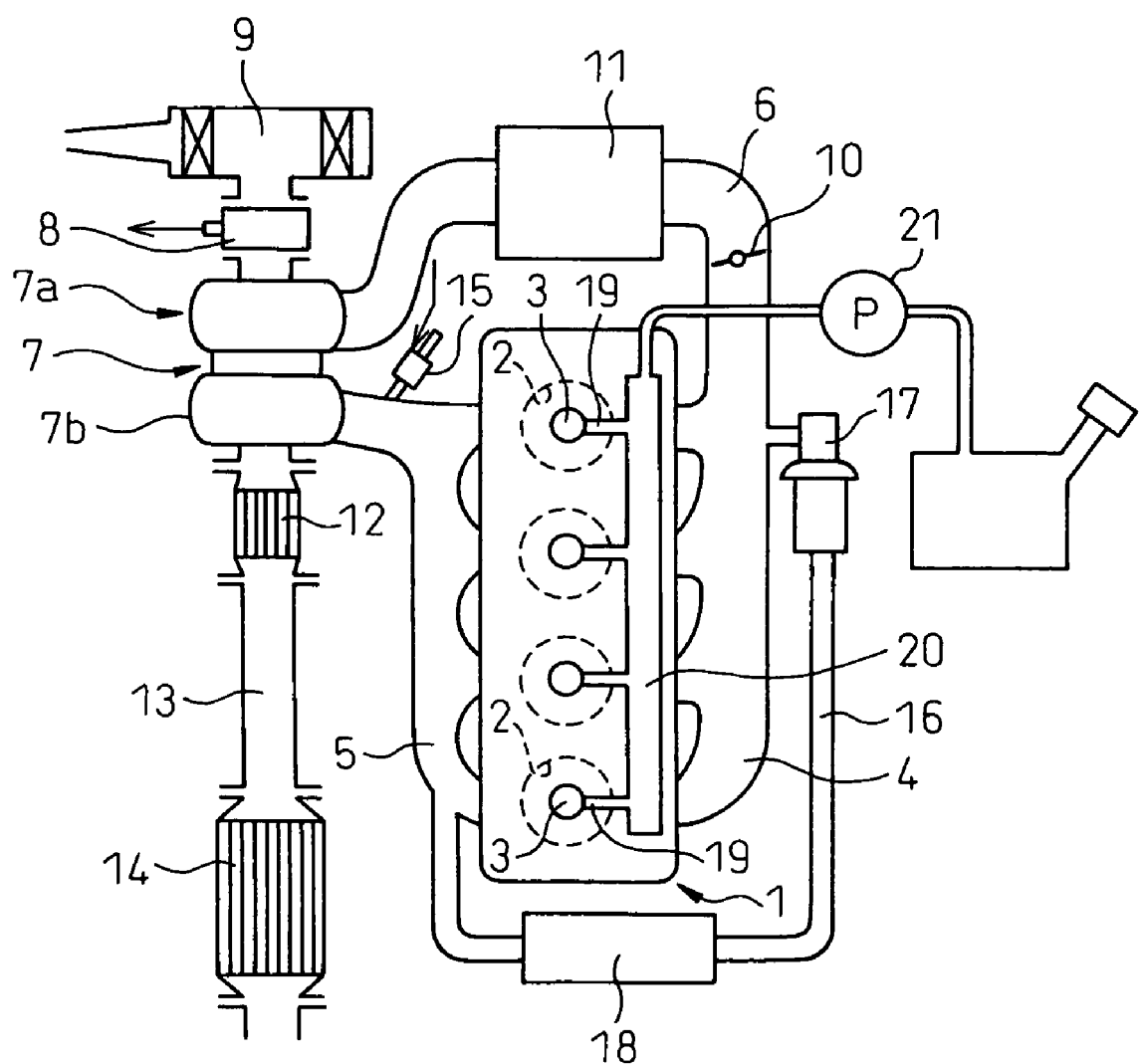
FIG. 1 is an overview of a compression ignition type internal combustion engine.

FIG. 1 is an overview of a compression ignition type internal combustion engine.

Referring to FIG. 1, 1 indicates an engine body, 2 a combustion chamber of each cylinder, 3 an electronically controlled fuel injector injecting fuel into each combustion chamber 2, 4 an intake manifold, and 5 an exhaust manifold. The intake manifold 4 is connected through an intake duct 6 to a compressor 7a of an exhaust turbocharger 7, while the inlet of the compressor 7a is connected through an intake air amount detector 8 to an air cleaner 9. Inside the intake duct 6, a throttle valve 10 driven by the step motor is arranged. Further, around the intake duct 6, a cooling device 11 for cooling the intake air flowing through the intake duct 6 is arranged. In the embodiment shown in FIG. 1, the engine cooling water is led into the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected to the inlet of a $NO_X$ storage catalyst 12 able to store the $NO_X$ contained in the exhaust gas. The cutlet of the $NO_X$ storage catalyst 12 is connected to a $NO_X$ selective reducing catalyst 14 via an exhaust pipe 13. Further, a fuel feed valve 15 for feeding a fuel into the exhaust gas flowing within the exhaust manifold 5 is attached to the exhaust manifold 5.

The exhaust manifold 5 and intake manifold 4 are connected to each other through an exhaust gas recirculation (hereinafter referred to as "EGR") passage 16. Inside the EGR passage 16, an electronic control type EGR control valve 17 is arranged. Further, around the EGR passage 16, a cooling device 18 for cooling the EGR gas flowing through the EGR passage 16 is arranged. In the embodiment shown in FIG. 1, engine cooling water is led to the cooling device 18 where the engine cooling water cools the EGR gas. On the other hand, each fuel injector 3 is connected through a fuel tube 19 to a common rail 20. This common rail 20 is fed with fuel from an electronically controlled variable discharge fuel pump 21. The fuel fed into the common rail 20 is fed through each fuel tube 19 into the fuel injectors 3.

Figure 2:
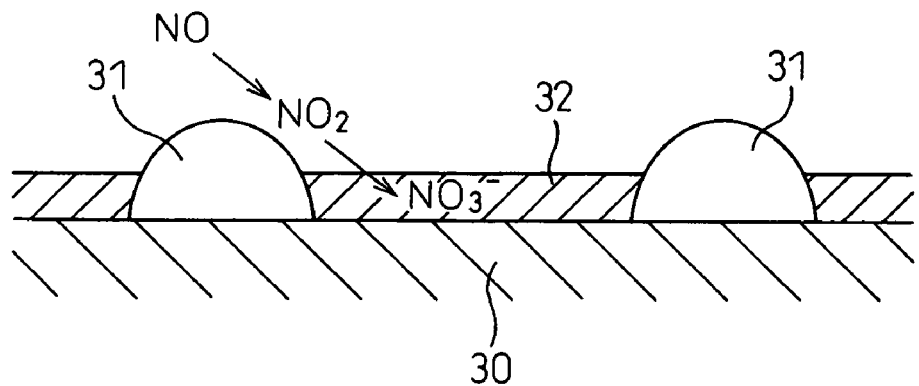
FIG. 2 is a cross-sectional view of the surface part of a catalyst carrier of an $NO_X$ storage catalyst.
Figure 2:
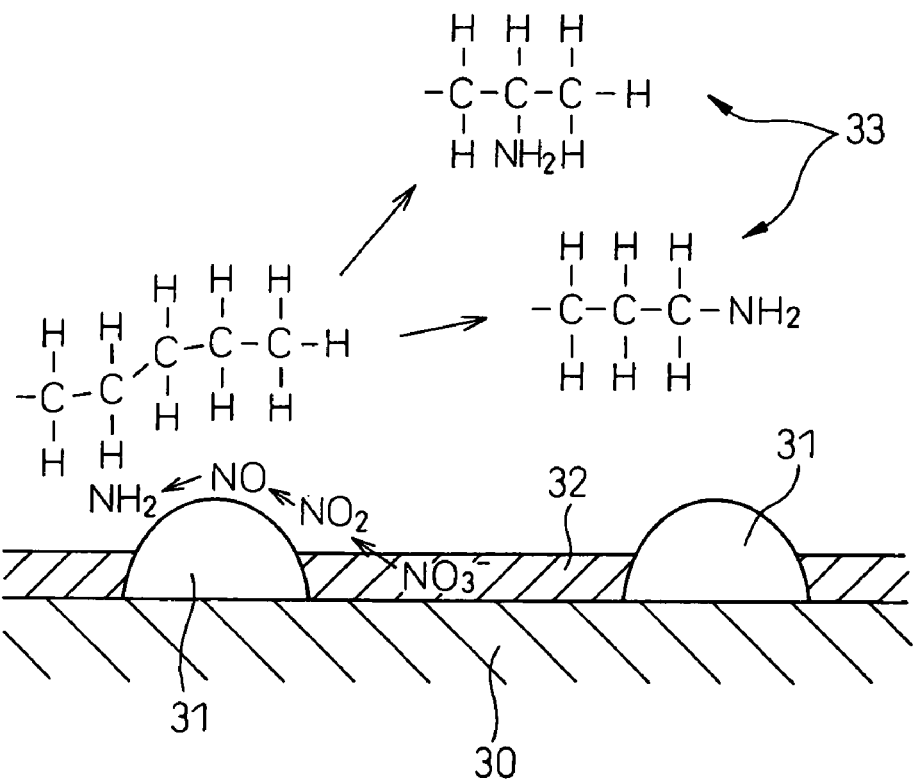

Initially, the $NO_X$ storage catalyst 12 will be explained. This $NO_X$ storage catalyst 12 is comprised of a substrate on which for example a catalyst carrier comprised of alumina is carried. FIG. 2(A), (B) illustrates the cross-section of the surface part of this catalyst carrier 30. As shown in FIG. 2(A), (B), the catalyst carrier 30 carries a precious metal catalyst 31 diffused on the surface. Further, the catalyst carrier 30 is formed with a layer of an $NO_X$ absorbent 32 on its surface.

In the embodiment according to the present invention, as the precious metal catalyst 31, platinum Pt is used. As the ingredient forming the $NO_X$ absorbent 32, for example, at least one element selected from potassium K, sodium Na, cesium Cs, and other such alkali metals, barium Ba, calcium Ca, and other such alkali earths, lanthanum La, yttrium Y, and other rare earths is used.

If the ratio of the air and fuel (hydrocarbons) fed into the engine intake passage, combustion chamber 2, and exhaust passage upstream of the $NO_X$ storage catalyst 12 is called the "air-fuel ratio of the exhaust gas", an $NO_X$ absorption and release action such that the $NO_X$ absorbent 32 absorbs the $NO_X$ when the air-fuel ratio of the exhaust gas is lean and releases the absorbed $NO_X$ when the oxygen concentration in the exhaust gas falls is performed.

That is, explaining this taking as an example the case of using barium Ba as the ingredient forming the $NO_X$ absorbent 32, when the air-fuel ratio of the exhaust gas is lean, that is, the oxygen concentration in the exhaust gas is high, the NO contained in the exhaust gas, as shown in FIG. 2(A), is oxidized on the platinum Pt 31 to become $NO_2$, next is absorbed in the $NO_X$ absorbent 32 and bonds with the barium oxide BaO to diffuse in the form of nitrate ions $NO_3^-$ into the $NO_X$ absorbent 32. In this way, $NO_X$ is absorbed in the $NO_X$ absorbent 32. So long as the oxygen concentration in the exhaust gas is high, $NO_2$ is formed on the platinum Pt 31. So long as the $NO_X$ absorbent 32 is not saturated in $NO_X$ absorption ability, $NO_2$ is absorbed in the $NO_X$ absorbent 32 and nitrate ions $NO_3^-$ are formed.

As opposed to this, for example if the exhaust gas is made a rich air-fuel ratio or stoichiometric air-fuel ratio, the oxygen concentration in the exhaust gas falls, so the reaction proceeds in the reverse direction ($NO_3^- \rightarrow NO_2$), therefore the nitrate ions $NO_3^-$ in the $NO_X$ absorbent 32 are released in the form of $NO_2$ from the $NO_X$ absorbent 32.

On the other hand, the $NO_X$ selective reducing catalyst 14 is comprised of an ammonia adsorption type Fe zeolite or a titania/vanadium based-catalyst having no ammonia adsorption function, which are capable of selectively reducing the $NO_X$ in the exhaust gas by ammonia when the air-fuel ratio of the exhaust gas is lean. In the embodiment shown in FIG. 1, the $NO_X$ selective reducing catalyst 14 is comprised of an ammonia adsorption type Fe zeolite.

Now, when the air-fuel ratio of the exhaust gas is lean as mentioned above, that is, when combustion is performed under a lean air-fuel ratio, the $NO_X$ in the exhaust gas is absorbed in the $NO_X$ absorbent 32. However, if combustion is continued under a lean air-fuel ratio, the $NO_X$ absorption ability of the $NO_X$ absorbent 32 will end up becoming saturated and therefore the $NO_X$ absorbent 32 will end up unable to absorb $NO_X$. Here, in an embodiment of the present invention, before the absorption ability of the $NO_X$ absorbent 32 becomes saturated, fuel is fed from the fuel feed valve 15 to make the $NO_X$ storage catalyst 12 release $NO_X$. This will be explained in the following.

In this embodiment of the present invention, diesel fuel or a heavy fuel having diesel fuel as a main ingredient is fed in a mist state, that is, in the form of particulates, from the fuel feed valve 15. Part of the fed fuel is oxidized, but the majority, as shown in FIG. 2(B), adheres to the surface of platinum Pt 31 and the surface of the $NO_X$ absorbent 32. If the fed fuel adheres to the surface of the platinum Pt 31, the oxygen concentration on the surface of the platinum Pt 31 will fall, causing the $NO_3^-$ of the $NO_X$ absorbent 32, as shown in FIG. 2(B), to be released in the form of $NO_2$.

If a large amount of fuel of an extent whereby the air-fuel ratio of the exhaust gas becomes considerably rich is fed from the fuel feed valve 15, that is, if the reducing agent for reducing the NOX is fed in a large amount, the released NO2, as shown in FIG. 2(B), will be reduced to NO and then to NH2. Next, this NH2 immediately reacts with the hydrocarbons HC adhering to the platinum 31, whereby, as shown in FIG. 2(B), an intermediate product 33 comprising the bonded molecules of the hydrocarbons HC and NH2 is produced. Note that the number of carbon atoms of the hydrocarbons HC in the fed fuel is considerably large, accordingly, in the NOX storage catalyst 12, the stored NOX and the fed fuel produce an intermediate product comprising bonded molecules of NH2 and a hydrocarbon molecule more than an equivalent ratio=1 with respect to one NOX molecule.

Thereby, the $NO_X$ stored in the $NO_X$ storage catalyst 12 is released from the $NO_X$ storage catalyst 12 by the fed fuel, and the released $NO_X$ is reduced.

Next, the intermediate product produced in the $NO_X$ storage catalyst 12 is fed into the $NO_X$ selective reducing catalyst 14 and is adsorbed at the $NO_X$ selective reducing catalyst 14. The intermediate product adsorbed at the $NO_X$ selective reducing catalyst 14 is broken down to hydrocarbons HC and ammonia $NH_3$ in the $NO_X$ selective reducing catalyst 14 if the temperature of the $NO_X$ selective reducing catalyst 14 rises. The hydrocarbons HC are oxidized by the oxygen contained in the exhaust gas when the air-fuel ratio of the exhaust gas is lean, whereby the $NO_X$ contained in the exhaust gas is reduced by the ammonia $NH_3$ adsorbed at the $NO_X$ selective reducing catalyst 14.

In this way, the $NO_X$ stored in the $NO_X$ storage catalyst 12 is transferred in the form of amine $NH_2$ to the $NO_X$ selective reducing catalyst 14, converted to ammonia $NH_3$ in the $NO_X$ selective reducing catalyst 14, and used for the purification of $NO_X$.

LIST OF REFERENCES

4 . . . intake manifold
5 . . . exhaust manifold
7 . . . exhaust turbocharger
12 . . . $NO_X$ storage catalyst
14 . . . $NO_X$ selective reducing catalyst
15 . . . fuel feed valve

The invention claimed is:

1. A method of purifying exhaust with an exhaust purification device, the device comprising:
   a $NO_x$ selective reducing catalyst;
   a $NO_x$ storage catalyst the $NO_x$ storage catalyst upstream from the $NO_x$ selective reducing catalyst and configured to store $NO_x$ contained in an exhaust gas comprising $NO_x$; and
   a fuel feed valve upstream of the $NO_x$ storage catalyst, the fuel feed valve being configured to feed a mist fuel from the fuel feed valve towards the $NO_x$ storage catalyst,
   the method comprising:
      feeding a mist fuel from the fuel feed valve downstream to the $NO_x$ storage catalyst and the $NO_x$ selective reducing catalyst;
      when the air-fuel ratio of the exhaust gas is stoichiometric or rich, releasing absorbed $NO_x$ from the $NO_x$ storage catalyst;
      reacting the released $NO_x$ with the mist fuel to produce an intermediate product comprising bonded molecules of $NH_2$ and a hydrocarbon molecule, an amount of hydrocarbon of the hydrocarbon molecule on the bonded molecules being larger than an amount of hydrocarbon used when reacting with one $NO_x$ molecule; and
      adsorbing the intermediate product at the $NO_x$ selective reducing catalyst.

2. The method of purifying exhaust as claimed in claim 1, wherein the $NO_x$ storage catalyst comprises a substrate and a catalyst carrier having a layer of a $NO_x$ absorbent on its surface, the catalyst carrier being carried by the substrate.

3. The method of purifying exhaust gas as claimed in claim 2, wherein a precious metal catalyst is carried on the catalyst carrier, and the $NO_x$ absorbent is at least one element selected from the group consisting of alkali metals, alkali earth metals, and rare earth metals.

4. The method of purifying exhaust gas as claimed in claim 3, wherein the $NO_x$ absorbent is at least one element selected from the group consisting of potassium, sodium, cesium, barium, calcium, lanthanum, and yttrium.

5. The method of purifying exhaust as claimed in claim 1, further comprising, when the air-fuel ratio of the exhaust gas is lean, adsorbing $NO_x$ from the exhaust at the $NO_x$ storage catalyst.

6. The method of purifying exhaust as claimed in claim 5, further comprising, when the air-fuel ratio of the exhaust gas is lean, selectively reducing $NO_x$ by ammonia at the $NO_x$ selective reducing catalyst.

7. The method of purifying exhaust as claimed in claim 1, wherein the $NO_x$ selective reducing catalyst comprises an ammonia adsorption type Fe zeolite or a titania/vanadium based catalyst having no ammonia adsorption function, the ammonia adsorption type Fe zeolite or the titania/vanadium based catalyst being configured to selectively reduce the $NO_x$ in the exhaust gas by ammonia when an air-fuel ratio of the exhaust gas is lean.

* * * * *